(12) United States Patent
Svensson et al.

(10) Patent No.: US 10,160,430 B2
(45) Date of Patent: Dec. 25, 2018

(54) SYSTEM AND METHOD FOR OPERATING A VEHICLE BRAKE SYSTEM

(71) Applicant: FORD GLOBAL TECHNOLOGIES, LLC, Dearborn, MI (US)

(72) Inventors: Thomas Svensson, Leichlingen (DE); Rudolf Daniels, Wermelskirchen (DE); Ian Moore, Pulheim (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 13/943,994

(22) Filed: Jul. 17, 2013

(65) Prior Publication Data
US 2014/0058639 A1 Feb. 27, 2014

(30) Foreign Application Priority Data
Aug. 21, 2012 (DE) .................. 10 2012 214 805

(51) Int. Cl.
*B60T 8/17* (2006.01)

(52) U.S. Cl.
CPC ............. *B60T 8/17* (2013.01); *B60T 2201/06* (2013.01)

(58) Field of Classification Search
CPC ........ B60T 2201/06; B60T 8/17; B60T 7/122; B60T 8/178; B60T 2201/04
USPC .............................................. 701/70, 75, 79
See application file for complete search history.

(56) References Cited

U.S. PATENT DOCUMENTS

| | | | |
|---|---|---|---|
| 4,428,468 A | 1/1984 | Chatterjea | |
| 5,222,787 A * | 6/1993 | Eddy | B60T 8/4072 303/10 |
| 5,398,923 A | 3/1995 | Perry et al. | |
| 5,471,386 A * | 11/1995 | Hrovat et al. | 701/82 |
| 5,630,656 A | 5/1997 | Stewart, Jr. | |
| 6,139,117 A * | 10/2000 | Shirai et al. | 303/3 |
| 6,161,074 A * | 12/2000 | Sielagoski et al. | 701/96 |
| 6,286,635 B1 | 9/2001 | Tamor | |
| 6,370,466 B1 | 4/2002 | Hada et al. | |
| 6,502,014 B1 * | 12/2002 | Herrmann et al. | 701/1 |
| 6,913,326 B1 * | 7/2005 | Ohkubo et al. | 303/11 |
| 7,627,415 B2 * | 12/2009 | Tschernoster et al. | 701/96 |
| 8,397,880 B2 | 3/2013 | Chelaidite | |

(Continued)

FOREIGN PATENT DOCUMENTS

| | | |
|---|---|---|
| DE | 102007030780 A1 | 1/2009 |
| EP | 2 511 146 A2 | 10/2012 |
| WO | WO 2012/055911 A2 | 5/2012 |

OTHER PUBLICATIONS

Tadashi Tamasho et al., "Technique for Reducing Brake Drag Torque in the Non-Braking Mode", 1999.

(Continued)

*Primary Examiner* — Rodney A Butler
*Assistant Examiner* — Daniel L Greene
(74) *Attorney, Agent, or Firm* — Jones Robb, PLLC; Franklin MacKenzie

(57) ABSTRACT

A method for operating a service brake system in a vehicle is described. The method includes the stages of determining whether the vehicle is stationary, and detecting whether the brake pressure exceeds a predetermined value in that stationary state. If the brake pressure value exceeds the predetermined value, as part of final stage, the method includes regulating the brake pressure to a predefined limiting value, where the predefined limiting value is sufficient to maintain the vehicle in that stationary state.

16 Claims, 3 Drawing Sheets

(56) References Cited

U.S. PATENT DOCUMENTS

| | | | |
|---|---|---|---|
| 2002/0193931 A1* | 12/2002 | Walenty | B60W 10/06 701/54 |
| 2003/0085576 A1* | 5/2003 | Kuang et al. | 290/40 C |
| 2004/0113489 A1* | 6/2004 | Iwagawa et al. | 303/155 |
| 2006/0106520 A1* | 5/2006 | Bodin et al. | 701/67 |
| 2006/0123776 A1 | 6/2006 | Viswanathan et al. | |
| 2010/0211281 A1 | 8/2010 | Baier-Welt et al. | |
| 2010/0308645 A1 | 12/2010 | Maron et al. | |
| 2012/0139328 A1 | 6/2012 | Brown et al. | |
| 2014/0058639 A1 | 2/2014 | Svensson et al. | |

OTHER PUBLICATIONS

German Search Report dated Oct. 4, 2013, with machine translation.

Non Final Office Action for U.S. Appl. No. 14/475,261, dated Jan. 15, 2016.

Final Office Action for U.S. Appl. No. 14/475,261, dated May 13, 2016.

Final Office Action dated Jun. 8, 2017 in co-pending U.S. Appl. No. 14/475,261.

Non-Final Office Action in co-pending U.S. Appl. No. 14/475,261, dated Sep. 22, 2017.

Notice of Allowance in co-pending U.S. Appl. No. 141475,261, dated Mar. 12, 2018.

Notification of First Office Action in CN Appln No. 201310365524.6, dated Dec. 5, 2016.

Advisory Action in co-pending U.S. Appl. No. 14/475,261, dated Aug. 16, 2016.

Non-Final Office Action in co-pending U.S. Appl. No. 14/475,261, dated Dec. 23, 2016.

Advisory Action in co-pending U.S. Appl. No. 14/475,261, dated Aug. 24, 2017.

* cited by examiner

SYSTEM AND METHOD FOR OPERATING A VEHICLE BRAKE SYSTEM

TECHNICAL FIELD

Embodiments of the present disclosure generally relate to service brake applications in vehicles, and, more particularly, to the efficient use of the service brake system.

BACKGROUND

Brake systems in vehicles generally include primary and secondary brake systems, which include, respectively, the service brakes and the parking brakes. The service brake system is generally used for stopping a vehicle during normal operations by applying a decelerating tangential force to at least the driven wheels of the vehicle. The service brake system is generally activated by the operator, most commonly via a brake pedal. The decelerating force is most often applied by a friction element, such as a brake shoe bearing on the friction lining of a drum, or by brake pads bearing on a disk. The parking, or auxiliary, brake system, on the other hand, is most often applied when a vehicle is parked for a relatively long period. That system typically takes the form of a clamping device, such as a clamp applied to the drive shaft of the vehicle, and a hand-operated lever or a foot pedal usually achieves activation.

During a temporary halt, such as waiting for a traffic signal to turn green, the service brake system is generally employed. In such situations, the driver may unthinkingly depress the service brakes (brake pedal) with significantly higher force than is required to keep the vehicle stationary. Generally, a driver will apply force to the brake pedal until the effort of that action becomes uncomfortable. Because the friction application device (e.g., the brake pad) is directly responsive to the activation device (e.g., the brake pedal), this action causes high compression of the brake pads, preventing their full retraction when the brake pedal is released. That effect leads to increased brake drag during operation, which in turn affects fuel efficiency, vehicular emissions, and general wear and tear to the vehicle.

In addition, excess braking pressure can lead to residual brake drag. When the driver applies a high level of braking force, brake system pressure does not immediately go to zero when the operator releases the pedal. Because of that pressure, the brake pads or shoes maintain contact with the disk or drum during the time required for the pressure to fall off. It can readily be seen that this effect produces a number of negative results, including excess fuel consumption and emissions required to overcome that drag, and excess brake wear produced by that drag.

No solution currently exists to counter brake drag owing to excessive brake force being applied during short vehicle halts.

SUMMARY

The present disclosure provides a method to control and minimize the residual pressure of vehicular brake systems when the service brakes are applied temporarily.

One aspect of the present disclosure describes a method for operating a service brake system in a vehicle. The method includes determining whether the vehicle is stationary or not. Upon determining a stationary state, the method includes detecting whether the brake pressure exceeds a predetermined value. If the brake pressure exceeds that predetermined value, the value of brake pressure is regulated to a predefined limiting value, which is sufficient to leave the vehicle in the stationary state.

Another aspect of the present disclosure describes a brake system in a vehicle. The system includes an actuating member, operably connected to a brake master cylinder, for initiating braking, and is therefore adapted to receive an input. The system includes one or more brakes, hydraulically connected to the brake master cylinder, and includes one or more sensors for measuring and communicating vehicle states. Here, the vehicle states may include at least an applied brake pressure and vehicle motion. A controller is operably connected to the one or more sensors and is configured to determine both whether the brake pressure exceeds a predetermined value and whether the vehicle is stationary or not. Upon determining that the brake pressure exceeds a predetermined value and that the vehicle is stationary, the controller regulates the brake pressure so that the maximum brake pressure does not exceed the predetermined value.

BRIEF DESCRIPTION OF THE DRAWINGS

The figure described below sets out and illustrates an exemplary embodiment of the disclosure. Throughout the drawing, like reference numerals refer to identical or functionally similar elements/matter. The drawing is illustrative in nature and is not drawn to scale.

DETAILED DESCRIPTION OF ILLUSTRATIVE EMBODIMENTS

Figure 1:
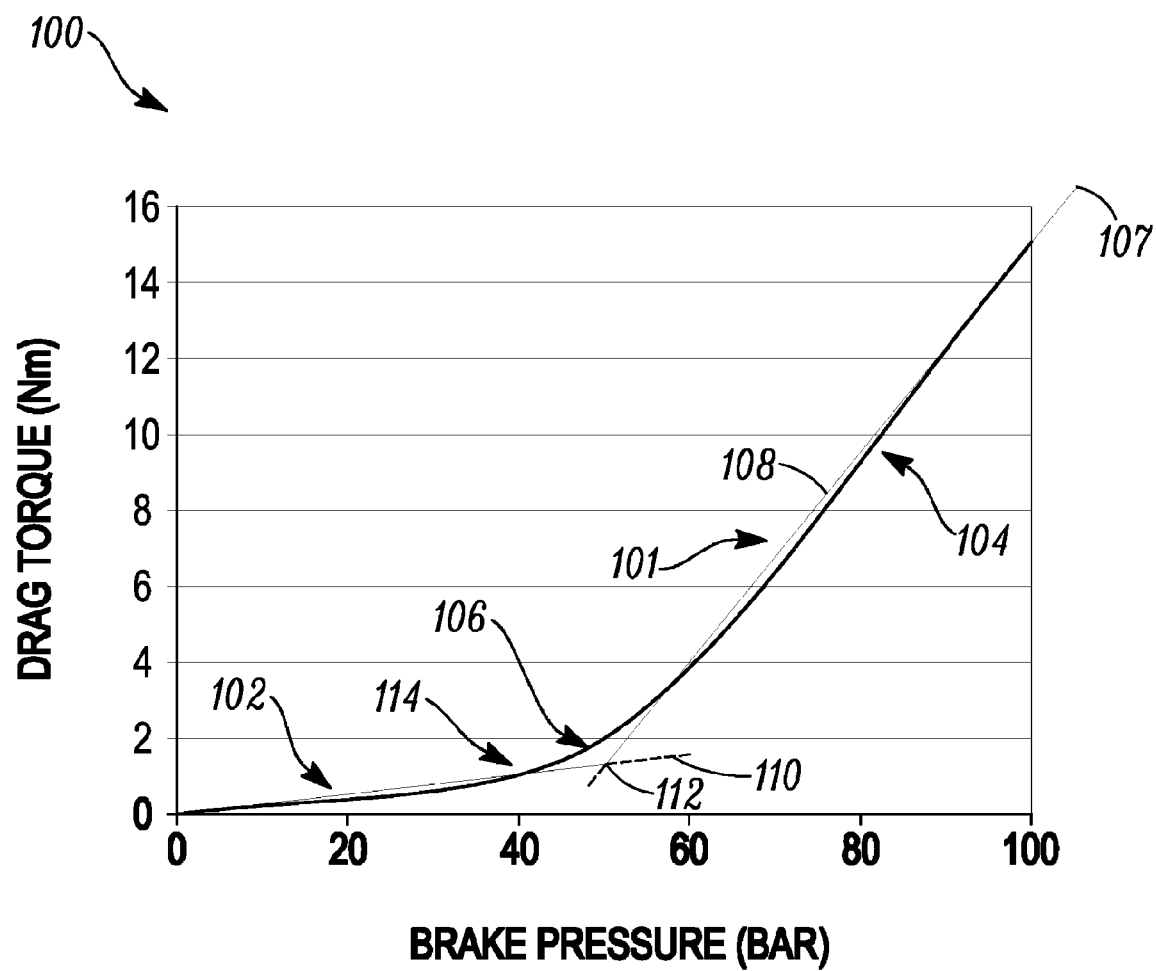
FIG. 1 is a graphical representation that defines brake pressure vs. drag torque in a vehicular brake system.

The following detailed description is made with reference to the figure(s). Exemplary embodiments are described to illustrate the subject matter of the disclosure, not to limit its scope, which is defined by the appended claims.

Overview

In general, the present disclosure describes a method for reducing the effects of residual drag in a vehicular brake system, and, more particularly, in a service brake system. To this end, the method includes initially determining whether the vehicle is stationary or not. If it is determined that the vehicle is stationary, detection is carried out to check whether the driver has activated an activation element, such as a brake pedal, to attain that stationary state. If that detection is positive, a signal is generated to reduce the brake pressure of the activation element to a predefined limiting value, sufficient to keep the vehicle in that stationary state.

Exemplary Embodiments

A vehicular brake system generally includes an activation element, commonly a brake pedal, connected to a known set of components, all interacting to define the service brake system. Activating the brake pedal, generally by depressing it, transmits the driver's intent to decelerate or stop the vehicle. A deceleration and/or an eventual halt is thus effected.

As noted above, when temporarily stopping the vehicle, the driver often depresses the brake pedal with relatively higher pressure than is necessary to maintain the vehicle in a stationary position, thereby increasing residual pressure, and consequently increasing brake system drag. To reduce residual brake system drag conditions thus experienced, the present disclosure sets out a system and a method that leverages the relation between the brake pressure and the drag torque to obtain a value to which the brake pressure may be reduced to, through known means.

As described in connection with FIG. 2, below, a related system includes a controller or a control unit connected to a number of sensors disposed at desired locations. More particularly, the sensors may include motion sensors as well as sensors that can detect the position of the brake pedal and the pressure level within the brake system. Mechanical or hydraulic pressure sensing means can be employed, depending on whether the brake system employs mechanical or hydraulic pressure application. Appropriate sensors provide information to the control unit The control unit may be of a known type, forming one part of the hardware of the said system, and may be a microprocessor based device that includes a central processing unit (CPU) for processing incoming signals from known source. The control unit may be provided with volatile memory units, such as a RAM and/or ROM that function along with associated input and output buses. Further, the control unit may also be optionally configured as an application specific integrated circuit, or may be formed through other logic devices that are well known to the skilled in the art. More particularly, the control unit either may be formed as a portion of an existing electronic control unit, or may be configured as a stand-alone entity.

As known to those of skill in the art, the control unit may include a memory where information can be stored and later retrieved. Further, modules that compute values through related algorithms installed therein may be included as well.

According to one aspect of the present disclosure, the control unit may store data that set out the relationship between the brake drag torque and the applied brake pressure in a compatible format, so that a minimum brake pressure value, sufficient to leave the vehicle in the stationary position, is established. More particularly, the minimum brake pressure value is established at a point referred to as a drag-knee point, where the drag torque starts increasing in substantial proportional equivalence as the brake pressure. Accordingly, the value of brake pressure established at the drag-knee point is set in the control unit, and serves as its predefined brake pressure limiting value. The control unit may be configured to repeatedly apply the established limiting value to adjust (reduce) the brake pressure during every vehicular stop.

Turning to FIG. 1, a substantially detailed graphical preview of the relation between the brake's drag torque and the applied brake pressure is laid out. As noted above, that relation establishes the drag-knee point. For ease of reference, the term 'drag torque' will be employed interchangeably with 'frictional torque'.

In the chart 100 of FIG. 1, the X-axis represents the brake pressure in bar, while the Y-axis represents drag torque or frictional torque 1 in Nm, plotted as a curve 101. The curve includes a generally flat portion 102 and a steeper portion 104, and the inflection point between those portions defines the drag-knee point 106. In terms of mechanical effect, drag-knee point 106 identifies the point at which a small increase in brake pressure produces a relatively large increase in drag torque. Thus, after reaching the drag-knee point 106 any increase in brake pressure will produce large increases in drag torque, producing substantial brake wear. Maximum system pressure is identified by point 107.

To identify the drag-knee point 106, the control unit may superimpose compensation best-fit straight lines 108 and 110, respectively, on the portions 104 and 102. The intersection of those lines at a point 112 may be superimposed to the curve 101 to identify the drag-knee point 106.

The drag-knee point 106 can be defined in terms of a single point 106, or a range of points corresponding to the transition from the curve's relatively flat portion 102 to relatively steep portion 104. Determining the configuration of a particular system, the transition portion can be defined in terms of the curve slope or in absolute terms, as will be understood by those of ordinary skill in the art. Once the drag-knee point 106 is established, the minimum brake pressure (predefined limiting value) can be extracted from those values. Alternatively, an average of multiple values that fall at the intermediate section 114 could be contemplated as well.

It will be readily understood that drag-knee point 106 will not be identical for all vehicles. Taking into account factors such as vehicle weight, brake design, and the like, particular service brake systems must be analyzed to produce individual characteristic curve 101.

The system described in connection with FIG. 2, below, include sensors to determine system states and parameters, as described there. During operation, sensor signals may be stored in the control unit's memory and further processed by the CPU and converted into compatible formats. Those readable formats are then utilized to compute if a reduction in the brake pressure within the system is required or not. The description further below covers an exemplary method of operation of the system discussed thus far.

Sensors may generally provide status indications for the vehicle, the service brake system actuator, and brake pressure. Accordingly, motion sensors indicate to the control unit whether the vehicle is moving. Then, a position detector determines and signals whether the activation element (such as the brake pedal) has been activated (depressed) to achieve that state. Next, one or more pressure sensors determine system pressure. In a typical hydraulically activated system, pressure sensors connected to the brake system's master cylinder sense the brake pressure applied and transmit that sensed signal to the control unit. Having received signals from the sensors, the control unit generates a subsequent signal to a valve or similar control elements, prompting a consequent adjustment in the brake pressure according to the predefined optimum or limiting value (drag-knee point). More specifically, as the pressure applied to the brake actuator increases, brake pressure within the system does not increase above a preselected level.

The brake pressure required to maintain the vehicle in a stationary state is held to an optimal level, even though the pressure applied to the system actuator would otherwise produce a considerably higher pressure. The optimum pressure value (limiting value) thus applied, counters the driver's request of a heightened pressure application. That optimum pressure value is an absolute value of the drag-knee point. This ensures that during a temporary halt, the brake pressure applied by the service brake system is optimally reduced, thus reducing the effects of residual pressure during operations, and in turn reducing brake wear, fuel consumption, and $CO_2$ emissions.

In effect, reducing the brake pressure to the drag-knee point during temporary stops not only leaves the vehicle in the temporary stationary state by the action of the service brake system, but also enhances braking efficiency by reducing the carbon footprint.

In some cases, if the absolute pressure value at the drag-knee point were insufficient to maintain a stationary position, the vehicle would start moving undesirably. For example, holding a vehicle stationary on a steep slope may require more system pressure than is exerted at the drag-knee point 106. The motion detectors could sense that condition and allow a hot application of a higher brake pressure. Alternatively, the driver could sense movement and apply increased pressure to the activation element to return the vehicle to the stationary condition. In some embodiments therefore, the control unit may generate a deceleration signal.

More specifically, the control unit may be additionally configured to determine or establish a deceleration signal, which may ensure that the brake pressure is reduced to the low absolute value in the region of the drag-knee point only when the vehicle is actually stationary and a deceleration is not detected.

Accordingly, instead of setting the limiting value to the absolute drag-knee point value, it is possible to set the limiting value that corresponds to both an absolute pressure value and an absolute deceleration value of 3 m/s$^2$ mean fully developed deceleration) ("mfdd") at Gross Vehicle Weight (GVW). Therefore, when a corresponding deceleration signal is generated, the optimum brake pressure value computed can be higher, and accordingly, the brake pressure is adjusted not according to the drag-knee point alone, but according to the vehicular movement as well.

In a preferred embodiment, it is advantageous if the method is carried out only when, in addition to the stationary state confirmation of the vehicle, a confirmatory absence of the deceleration signal is detected and established. In that manner, a driver may stop the vehicle, ensuring that any reduction or adjustments to the brake pressure will not be insufficient for a positive stop, and thus, is neither damaging, nor dangerous.

More specifically, only the fluid portion (or quantity) that generates the requisite optimal brake pressure may act as the working fluid, transmitting that pressure to a set of vehicular wheels. The remaining portion of the brake medium, however, upon which the same pressure has acted, may remain unutilized. As an option therefore, that unutilized fluid may be directed to and be stored in a storage element, such an accumulator. In this manner, it is possible to utilize the employed brake mediums efficiently, as only a requisite portion of the fluid corresponds to an absolute pressure value, and thus, supplied. The brake medium stored in the storage element, which possesses the pressure value, can be introduced later on into the system when required.

In some further embodiments, those of skill in the art will understand that it is possible to provide for the inlet valves of an ESC (Electronic Stability Control) system to be closed at the pressure level of the predefined limiting value.

An alternative approach would employ the pressure assist portion of a brake system to limit brake system pressure. As is well known in the art, most contemporary vehicles include a pressure assist sub-system, which amplifies the force applied by the operator. If the driver exerts a braking force of 50 N, for example, the pressure assist could multiply that force by a factor of eight, providing 400 N force applied to the master cylinder piston. To accomplish the goals of the present disclosure, the pressure assist could be limited to operate at system pressures up to the drag-knee point 106 when the vehicle is stationary. In that manner, the driver can apply more braking force to the pedal, but that force would not be amplified, and thus that force would quickly become uncomfortable for the driver.

Figure 2:
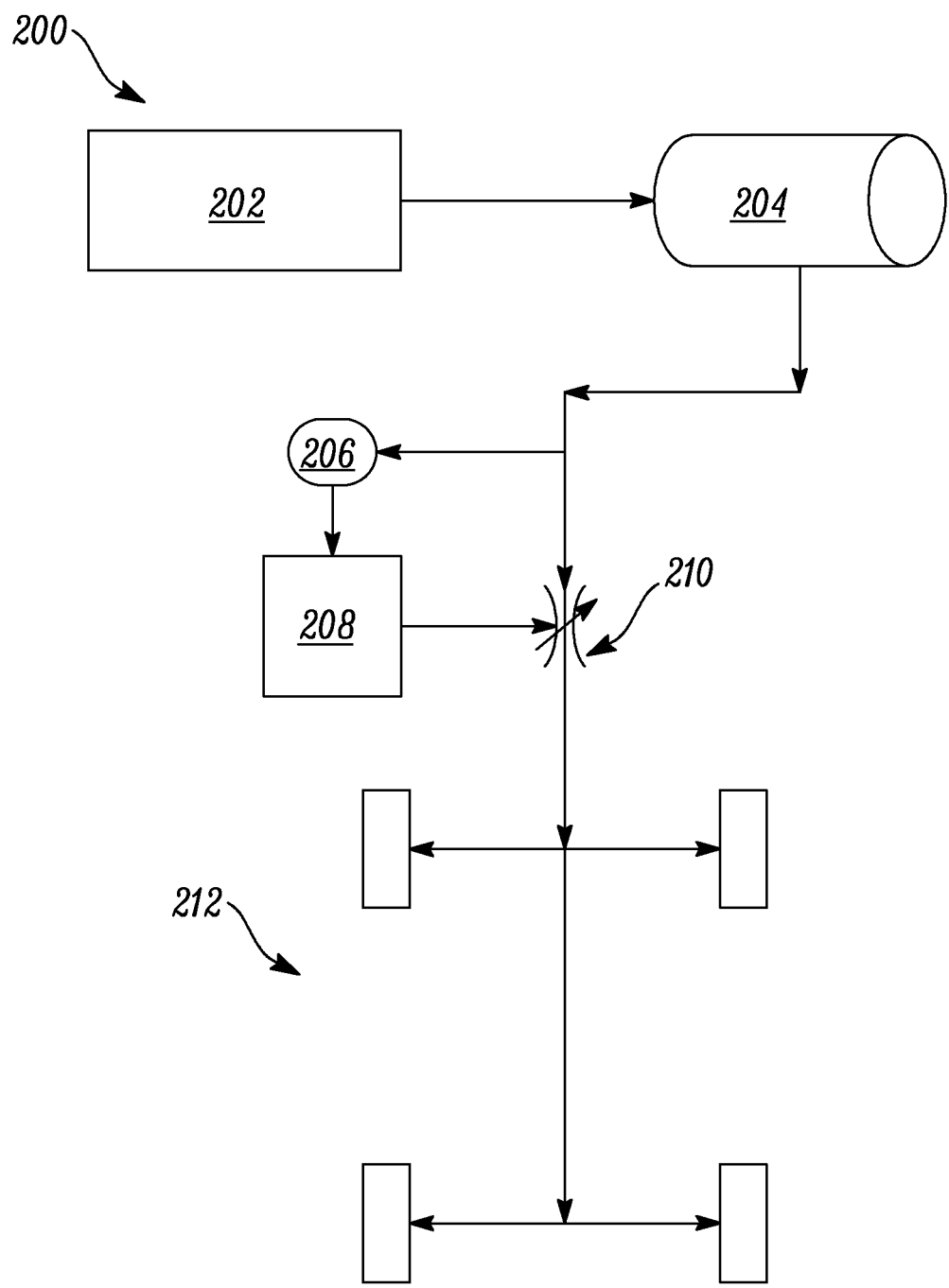
FIG. 2 is an exemplary schematic layout of the vehicle brake system according to the present disclosure.
Figure 3:
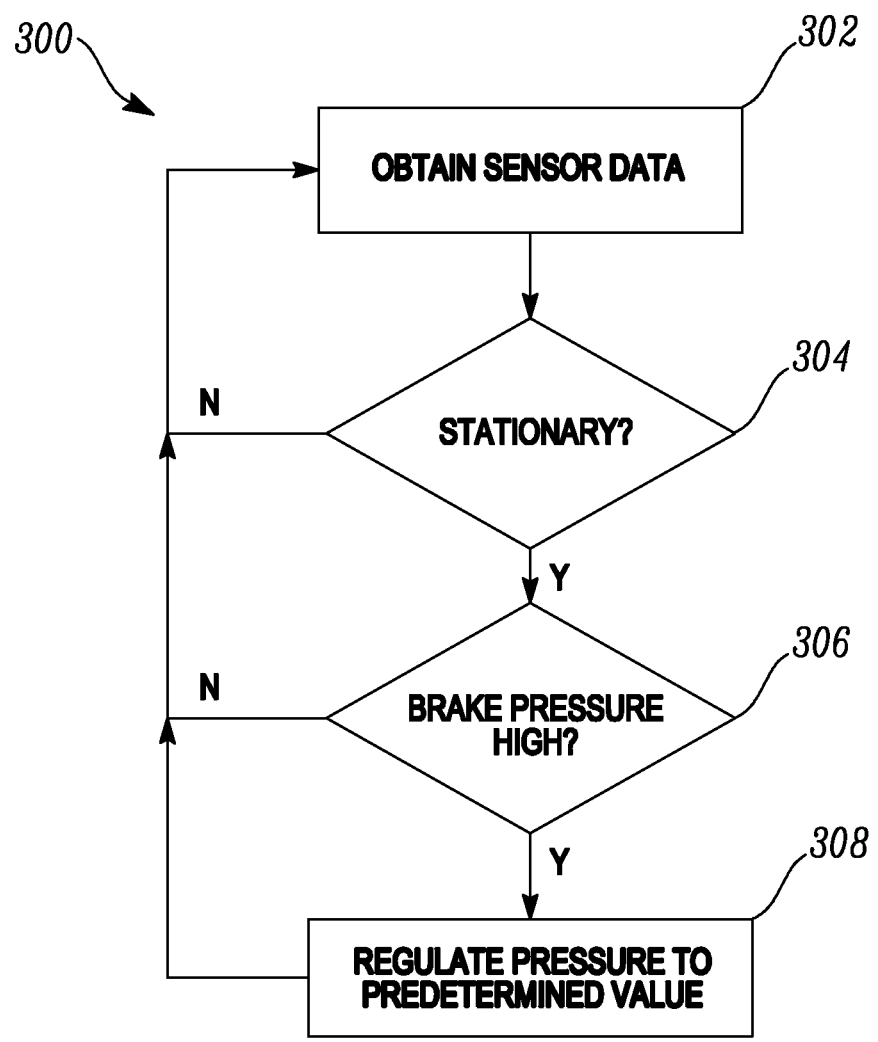
FIG. 3 lays out a flowchart illustrating an exemplary operational method of the system depicted in FIG. 2.

FIG. 2 schematically depicts an embodiment of a system 200 for performing the method of the present disclosure, and FIG. 3 is a flowchart depicting the process for employing that system. It is to be noted that the features that are disclosed and specified individually in the description can be combined with one another in any technically appropriate or purposeful manner, and may present further refinements or combinations of the subject matter. Accordingly, all aspect discussed so far must be viewed as not being restrictive in any sense.

As would be expected, system 200 starts from the components present in a conventional service brake system. Here, a hydraulically actuated system is contemplated, as seen in many contemporary automobile designs. There, an actuating member, such as brake pedal 202 transmits a pressure signal to brake master cylinder 204. The signal is generally transmitted through a linkage rod, though in some embodiments the signal can be purely electronic, based on a sensor element determining the amount of brake pedal movement and developing a signal proportional to that movement. Master cylinder 204 generates hydraulic pressure based on the input from the brake actuator 202, and that pressure is transmitted through appropriate hydraulic lines to wheels 212. The depicted embodiment transmits braking pressure to all four wheels, but in some embodiments, braking pressure may only be provided to one, two, or three wheels. Where more than four wheels are employed, braking systems can be provided to some or all wheels, as desired.

The present disclosure supplements the conventional braking system with a sensor array 206, a controller 208, and a pressure valve for regulator 210. The sensor array 206 determines two conditions (step 302). First, it must be determined whether the vehicle is moving or stationary. Some contemporary vehicles already include motion sensors for other purposes, and such systems may receive data from existing sensors. Otherwise, appropriate sensors, well known and available to those in the art, are employed to signal whether the vehicle is in motion or stationary. Alternatively, one can determine whether the vehicle is decelerating, using an appropriate sensor, permitting the inference that the combination of high brake pressure and lack of deceleration indicates that the vehicle is stationary. Also, the sensor must determine brake pressure, which in the depicted system is accomplished by sensing hydraulic pressure, as shown, and as discussed above.

Signals reflecting the two sensed conditions are forwarded to the controller 208, which analyzes the sensor information and takes appropriate action. Controller 208 can be a separate standalone system, or it could be embodied in a controller computer system already present in a vehicle. In either event, the controller 208 first determines if the vehicle is stationary (step 304). If not, the method loops back to the obtaining data step, which continues until it is determined that the vehicle is in fact stationary.

If the vehicle is stationary, system moves to step 306, where controller 208 determines whether brake pressure exceeds the drag-knee point 106 (FIG. 1). If not, the method loops back for further data collection. Where brake pressure does exceed the drag-knee point 106, controller 208 takes action to regulate the brake pressure (step 308) to a level at or below the drag-knee point 106. A number of methods are available to those in the art for performing that action, including the use of a valve or pressure regulator 210. Such devices are well known in the art, and they have the effect of establishing a maximum pressure level for the system. In some embodiments, the valve or regulator 210 may redirect a portion of the brake fluid flow to the master cylinder or other system component, leaving only a portion of the fluid flow sufficient to produce a brake pressure less than the drag-knee point 106.

Certain components described in the application may function independently of each other, and thus, none of the implementations need to be seen as being restricted to the disclosed environment alone. Further, it may be well known to those in the art that the description of the present disclosure may be applicable to a variety of other environments as well, and thus, the environment disclosed herein must be viewed as being purely exemplary.

In some embodiments, a slope sensor could be added to sensor array 206 and integrated with the system 200 for varying the brake system pressure by an amount sufficient to allow for a gradient, either positive or negative. Gradient sensors are well known in the art, and integrating such sensors lies well within the skill of those in the art. The general weight of a particular vehicle could be stored in an available look-up memory in controller 208, and that unit can be further programmed to calculate the difference in brake system pressure required to compensate for any sensed gradient.

The description illustrates aspects and embodiments of the subject matter and its implementation. This description should not be understood as defining or limiting the scope of the present disclosure, however, such definition or limitation being solely contained in the claims appended thereto. Although the best mode of carrying out the invention has been disclosed, those in the art would recognize that other embodiments for carrying out or practicing the subject matter are also possible.

Accordingly, those skilled in the art will understand that variations in these embodiments will naturally occur in the course of embodying the subject matter of the disclosure in specific implementations and environments. It will further be understood that such variations will fall within the scope of the disclosure. Neither those possible variations nor the specific examples set above are set out to limit the scope of the disclosure. Rather, the scope of claimed invention is defined solely by the claims set out below.

What is claimed is:

1. A method for operating a service brake system in a vehicle, comprising:
    with a controller:
        determining whether the vehicle is stationary;
        determining whether a brake pressure exceeds a drag-knee point for the vehicle; and
        while the vehicle is stationary, regulating the brake pressure to the drag-knee point for the vehicle comprising a stationary brake pressure that is determined based at least in part on a predetermined vehicle weight and a predetermined brake system design for the vehicle, the regulated brake pressure being sufficient to maintain the vehicle in the stationary state, wherein the drag-knee point is the point beyond which a small increase in brake pressure corresponds to a relatively large increase in drag torque for the vehicle when a brake actuator is released.

2. The method of claim 1, wherein regulating the brake pressure to the drag-knee point further comprises regulating the brake pressure to a pressure required to decelerate the vehicle at a rate of 3 m/s$^2$.

3. The method of claim 1, wherein regulating the brake pressure to the drag-knee point further comprises regulating the brake pressure to a minimum brake pressure value.

4. The method of claim 1, further comprising determining a vehicle gradient, and modifying the drag-knee point to allow for the vehicle gradient.

5. The method of claim 1, wherein the regulating step includes disabling a brake system power assist sub-unit at brake system pressures above the drag-knee point.

6. The method of claim 1, wherein regulating the brake pressure comprises holding the brake pressure to the drag-knee point when a force exerted by a driver of the vehicle on an actuating member for braking is increased.

7. A brake system in a vehicle, comprising:
    an actuating member for initiating braking, adapted to receive an input;
    a brake master cylinder, operably connected to the actuating member;
    one or more brakes, hydraulically connected to the brake master cylinder;
    one or more sensors for measuring and communicating vehicle states, the vehicle states including at least brake pressure and vehicle motion;
    a controller operably connected to the one or more sensors, and configured to determine whether the brake pressure exceeds a drag-knee point for the vehicle and whether the vehicle is stationary, wherein the drag-knee point is the point beyond which a small increase in brake pressure corresponds to a relatively large increase in drag torque for the vehicle;
    upon determining that the brake pressure exceeds the drag-knee point and that the vehicle is stationary, the controller is further configured to regulate brake pressure so that the maximum brake pressure does not exceed the drag-knee point, the regulated brake pressure being sufficient to maintain the vehicle in the stationary state.

8. The system of claim 7, wherein the brake pressure value regulation includes reducing the brake pressure to the drag-knee point if a deceleration signal, obtained by vehicular deceleration, is absent.

9. The system of claim 7, wherein the brake pressure regulation further comprises regulating the brake pressure to a minimum brake pressure value.

10. The system of claim 7, wherein the brake pressure regulation further comprises regulating the brake pressure to a pressure that corresponds to an absolute deceleration value of 3 m/s$^2$ at gross vehicle weight (GVW).

11. The system of claim 7, further comprising a regulator valve, operably connected to the controller.

12. A method for operating a vehicle service brake system, comprising:
    with a controller:
        determining whether the vehicle is stationary;
        determining whether driver braking has caused the stationary state; and
        while the vehicle is stationary due to driver braking, regulating vehicle brake pressure to a brake system's drag-knee point, the drag-knee point being selected based on a point in a relationship between brake drag torque and applied brake pressure at which a small increase in brake pressure corresponds to a relatively large increase in drag torque for the vehicle when an actuating member for braking is released.

13. The method of claim 12, wherein the regulated brake pressure is sufficient to maintain the vehicle in the stationary state.

14. The method of claim 12, wherein regulating vehicle brake pressure comprises holding the brake pressure to the drag-knee point when a force exerted by a driver of the vehicle on the actuating member for braking is increased.

15. The method of claim 12, wherein regulating the brake pressure comprises reducing the brake pressure below a pressure requested by a driver to the drag-knee point.

16. The method of claim 12, wherein the brake system includes stored data regarding the relationship between brake drag torque and applied brake pressure for the vehicle, and further comprising determining the drag-knee point based on the stored data.

* * * * *